Dec. 29, 1931.  R. E. ANCHORS  1,838,127

CROSS CHAIN FOR AUTOMOBILE TIRE CHAINS

Filed March 11, 1931

INVENTOR.
Ralph E. Anchors
BY
Mark M. Decker
ATTORNEY.

Patented Dec. 29, 1931

1,838,127

UNITED STATES PATENT OFFICE

RALPH E. ANCHORS, OF WASHINGTON, PENNSYLVANIA

CROSS-CHAIN FOR AUTOMOBILE TIRE-CHAINS

Application filed March 11, 1931. Serial No. 521,670.

This invention constitutes an improvement upon my former application for patent, Serial No. 514,755, filed February 10, 1931.

The object of this invention is, to construct the links for the cross-chains in two separate sections and in such a manner as to permit the cushioning of the links proper and also the cushioning of the two sections with relation to each other, thus reducing the shock and wear on the links themselves and on the tires.

My invention consists of the improvements as shown, and as will be more fully described hereinafter, and combines certain novel features and details of construction as appears in the drawings and more particularly explained in the specification.

I will now describe my invention, reference being had to the accompanying drawings in which similar letters of reference indicate corresponding parts in the several figures, and in which Figure 1 is a plan view of a section of my improved cross-chain assembled.

Figure 1:
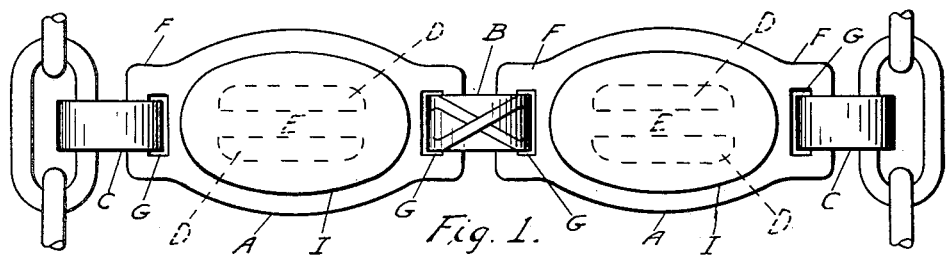
Figure 2:
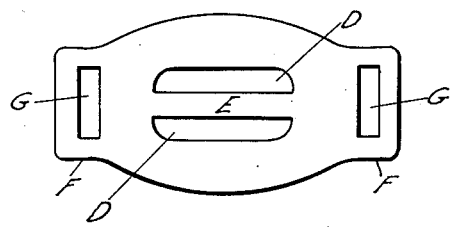
Fig. 2 is a plan view of one of the links, the cushioning material being removed.
Figure 3:
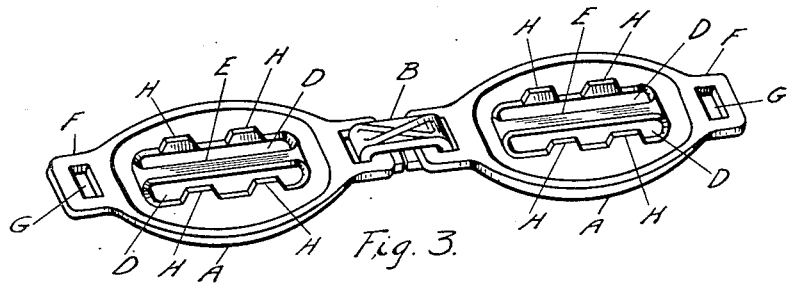
Fig. 3 is a perspective view of the link separated, showing clearly the construction of the two parts.
Figure 4:
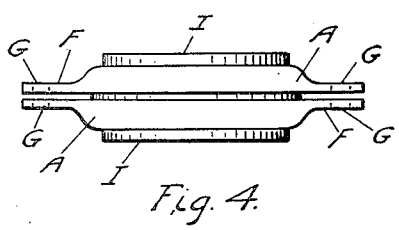
Fig. 4 is a side elevation of one of the links in its finished form.
Figure 5:
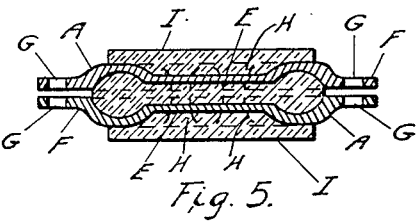
Fig. 5 is a central longitudinal sectional view of the same.

A represents the links proper, B, the connecting links and C, the auxiliary connecting links used for connecting the cross-chains to the side chains.

As will be seen, the links A, are formed in two separate sections and provided with apertures D, in the center portions thereof and a cross-member E, spanning said apertures, the purpose of which will be described more fully hereinafter. The links are also provided with extensions F, on each end thereof, which have holes G, for receiving the connecting links B, and the auxiliary connecting links C.

Inwardly projecting lugs H, are also formed on the inner edges of the apertures D, which provide bearing surfaces for the two sections of the links A.

In constructing my improved cross-chains, the links are formed, stamped or moulded in two sections and in about the same configuration shown in the drawings.

The links are concave on their inner sides as shown, for the purpose of holding rubber cushions I, more rigidly in position.

In assembling my improved links, the two sections of the link are placed one over the other and held slightly apart for the purpose of permitting the rubber to be run or forced in between the outer edges of same.

Pressed or moulded into the apertures in the center of the links A, are suitable rubber cushions I, which project entirely through the center of the link proper and out over the outer surface thereof and surrounds the cross-members E, all of which help to retain the cushions in position.

The main links A, are connected together by means of connecting links B, and to the side chains by the auxiliary links C.

By the use of my improved cross-chains, a more durable and elastic wearing surface is provided, which prolongs the life of the links and at the same time, cushions the shock to both the tire and the links of the cross-chains.

I am aware that certain modifications may be made in the details of construction of my invention without departing from the nature of same, therefore, do not confine myself to the exact configuration shown.

Having described my invention, what I claim and desire to secure by Letters Patent is:

1. The improvements in cross-chains for automobile tire-chains, consisting of links proper each of which comprises two superposed separate sections provided on their inner surfaces with recesses and apertures in the centers thereof, cross-members spanning said apertures, lugs formed on the inner edges thereof which provide bearing surfaces for the two sections of the link, extensions formed on each end of the link which are provided with slots for receiving connecting links and auxiliary connecting links, cushions moulded into said recesses and apertures and projecting out and over the exterior of said links which form bearing and wearing surfaces therefor, all substantially as and for the purposes shown and described.

2. The improvements in cross-chains for automobile tire-chains, consisting of main links which comprise two superposed separate sections provided on their inner surfaces with concave recesses and in their centers with apertures, cross-members spanning said apertures, lugs formed on the inner edges of the same which form wearing and bearing surfaces of the two sections of the links proper, together with slots formed in the ends of said links for receiving connecting links and auxiliary connecting links, cushions of rubber moulded into said apertures and recesses and extending out and over the exterior surfaces of the links and between the separate sections thereof which form bearing and wearing surfaces therefor, all substantially as shown and for the purposes described.

In testimony that I claim the foregoing as my own invention, I have hereunto set my hand.

RALPH E. ANCHORS.